(12) United States Patent
Winzinger et al.

(10) Patent No.: US 8,162,639 B2
(45) Date of Patent: Apr. 24, 2012

(54) REDUCTION OF WEAR ON CONTROL CAMS

(75) Inventors: Frank Winzinger, Regensburg (DE); Thomas Hoellriegl, Teublitz (DE); Harald Steinberger, Thalmassing (DE)

(73) Assignee: Krones AG, Neutraubling (DE)

( * ) Notice: Subject to any disclaimer, the term of this patent is extended or adjusted under 35 U.S.C. 154(b) by 263 days.

(21) Appl. No.: 12/700,171

(22) Filed: Feb. 4, 2010

(65) Prior Publication Data

US 2010/0196531 A1     Aug. 5, 2010

(30) Foreign Application Priority Data

Feb. 5, 2009   (DE) .......................... 10 2009 007 717

(51) Int. Cl.
*B29C 49/42* (2006.01)

(52) U.S. Cl. .............. 425/3; 74/567; 425/522; 425/524; 425/540

(58) Field of Classification Search .............. 425/3, 522, 425/524, 540, DIG. 5; 74/567, 569
See application file for complete search history.

(56) References Cited

U.S. PATENT DOCUMENTS

| | | | |
|---|---|---|---|
| 2,292,728 A | * | 8/1942 | Walti .............................. 74/567 |
| 5,531,588 A | | 7/1996 | Brun, Jr. et al. |
| 7,399,177 B2 | * | 7/2008 | Brachet et al. ................. 425/529 |
| 7,862,328 B2 | * | 1/2011 | Toutoux et al. ............... 425/529 |

FOREIGN PATENT DOCUMENTS

| | | |
|---|---|---|
| DE | 23 54 391 A | 5/1975 |
| DE | 10 2007 011 060 A1 | 9/2008 |
| WO | 2008/106921 A1 | 9/2008 |

* cited by examiner

*Primary Examiner* — Robert B Davis
(74) *Attorney, Agent, or Firm* — Rissman, Hendricks & Oliverio, LLP

(57) ABSTRACT

An apparatus for treating containers such as, for example, liquid containers, may include at least one treatment unit, which treats the containers in a predetermined manner. The treatment unit may be moved along a specified path of travel. The apparatus may include a guiding cam, which is designed in such a way that it causes at least once along the path of travel a movement of the treatment unit in a direction extending vertically relative to the path of travel. The treatment unit may include a guiding element, which is at least at times in contact with the guiding cam, and wherein a force acting between the guiding element and the guiding cam varies at least at times along a specified area of the path of travel. In various aspects, the apparatus may include a force reduction device, which causes the force acting at a certain point of the area between the guiding cam and the guiding element to be reduced at least on average.

20 Claims, 2 Drawing Sheets

REDUCTION OF WEAR ON CONTROL CAMS

CROSS-REFERENCE TO RELATED APPLICATION

This application claims the benefit of priority of German Patent Application No. 10 2009 007 717.0, filed Feb. 5, 2009, pursuant to 35 U.S.C. 119(a)-(d), the disclosure of which is incorporated herein by reference in its entirety as if fully set forth herein.

TECHNICAL FIELD

The present disclosure relates to apparatuses and methods for treating containers and, in particular, for reducing the wear on control cams.

BACKGROUND

In the beverage producing industry, a variety of apparatuses and methods for treating containers is known. Examples of such apparatuses are moulding units or blow-moulding units, which convert plastic preforms into plastic containers. Further examples are heating devices, which heat the containers or which close a mould carrier for such preforms. Apart from that, cleaning devices for such containers are also known.

In the case of many of these machines it is necessary that the containers to be treated are conveyed not only along a specified transport path, but that a treatment unit of the machine or the containers themselves are moved in a direction extending vertically relative to this path of travel, in order to carry out a certain treatment process. Usually, a special treatment unit such as a blow nozzle or a stretching rod is moved for this purpose, but it would also be possible to move a means of transport holding the container in an appropriate manner. In order to carry out such movements, guiding cams are frequently employed in the prior art, which guiding cams interact for example with guiding rollers of the corresponding treatment unit, in order to effect this movement vertically relative to the transport path.

These guiding cams work reliably and in a satisfactory manner even over longer periods of time. For example, DE 2354391 describes a multiple station rotary table blow moulding machine. In this disclosure, attention is drawn to the fact that a certain play in the form of a tolerance between the external diameter of the follower and a cam path needs to be provided. However, it is also pointed out that this play shouldn't be made to be excessively large, since otherwise there is a risk of the corresponding guiding path wearing out. U.S. Pat. No. 5,531,588 describes an adjustable cam guide for a blow moulding machine.

From DE 10 2007 011 060 A1, a method for blow moulding containers is known, wherein a support element having a movable cam segment may be coupled in such a manner that the support element is arranged to be controllable either in an operating position or in an idle position. However, this document, too, does not include any reference to reducing the wear of such cam segments. Also, this possibility of coupling does not result in a corresponding wear reduction.

Further, there has been a tendency in some cases recently to replace mechanical guiding cams with separate servo-motor drives of the treatment units. Nevertheless, the use of guiding cams has proven to be very reliable in many areas.

It may therefore be desirable to provide methods and apparatuses for achieving a reduction of wear on mechanical guiding cams when used in apparatuses for treating containers.

SUMMARY OF INVENTION

In accordance with various aspects of the disclosure, an apparatus for treating containers such as, for example, liquid containers may include at least one treatment unit, which treats the containers in a predetermined manner. Herein, the treatment unit may be moved along a specified path of travel and the apparatus has a guiding cam, for example, a mechanical guiding cam, which is designed in such a way that it effects or picks up, at least once along the path of travel, a movement of the treatment unit in a direction extending vertically relative to the path of travel.

The word "effect" as used herein is to be understood to mean directing or guiding the guiding elements of the treatment unit, i.e., the effecting of this movement is caused in particular by the guiding cam. On the other hand, in the case of a "pick-up," any movements caused by the treatment unit or the guiding element thereof are received or picked up. Both in the case of effecting and in the case of picking up, however, forces are caused to act on the guiding cams.

Further, the treatment unit has a guiding element which is at least at times in contact with the guiding cam, while a force acting between the guiding element and the guiding cam varies at least at times along a specified area of the path of travel. These force variations could also be such variations which occur only for a very short time or as a shock.

In particular, this variation of force may also be seen as the difference between the shock immediately upon impact of the guiding element on the guiding cam and the force during the further movement of the guiding element on the guiding cam.

According to the disclosure, the apparatus includes means for reducing force, which cause the force acting on at least one certain point of the area between the guiding cam and the guiding element to be reduced at least on average.

A treatment unit which treats the containers may be a unit which expands the containers, fills them, cleans them, conveys them, or the like. For the purposes of this treatment, this treatment unit is guided along the above-mentioned path of travel. A movement of the treatment unit in a direction extending vertically relative to the path of travel is to be understood to mean that such a movement always also includes a component of movement in the direction extending vertically to the path of travel. Therefore, this movement may also be a movement in a direction extending at an upward or downward angle relative to the path of travel or the like. The movement of the treatment unit herein is effected by the contact between the guiding element, for example a guiding roller, and the guiding cam, as is also known in the prior art.

The apparatus may include a holding device for holding the containers, wherein a movement of this holding device along the path of travel is coupled with the movement of the treatment unit.

The means for reducing force may be both a mechanical element which reduces the force concerned and a control device which effects this reduction of force. Following below is a description of several possibilities for achieving such a reduction of force. For example, it is possible to reduce a specific force developing between the guiding element and the guiding cam at a certain position.

Such a reduction of force on average would also be made possible by changing the exact point of impact of the guiding roller on the guiding cam or by spreading the effect of force on the guiding cam statistically or in another way. In either case, a reduction of wear is achieved since it is to be noted here that the wear is caused on the one hand by the particular acting forces and on the other, however, also by the frequency of these occurring forces. A reduction of wear is possible due to the fact that at least one of these two parameters is influenced in a favorable, i.e., force reducing, manner. In the case of either measure, the occurring force acting on the above-mentioned point or area of the guiding cam is reduced at least on average.

In some embodiments, the guiding element is at times in contact with the guiding cam and at times it is not in contact with the guiding cam. Further, the guiding element comes into contact with the guiding cam at a point of impact which lies in the specified area, and the force reducing means effects a reduction of the force acting on a point, and in particular on this particular point, of the area between the guiding cam and the guiding element at least on average.

In this embodiment, for example, the guiding element impacts on the guiding cam and it is the aim to reduce any wear effects caused by this impact. However, it is pointed out that this is not necessarily restricted to a contact taking place, but particular forces may also act in cases where the guiding cam is designed in a particular way, for example with abruptly changing gradients, and these may be reduced on average.

In further exemplary embodiments, a projection of the path of travel in the direction extending vertically to the path of travel is essentially a circle. This means that the treatment devices, if viewed in a projection, move along a circular path.

In some exemplary embodiments, the point of impact is variable within this area. By means of this modification of the point of impact, the force acting on a certain point of the guiding cam is reduced or spread over a certain area. This area may extend in the first instance along the guiding cam but also vertically thereto. In some embodiments, this point of impact is statistically changed. Thus, for example, the treatment units may be controlled in such a way that their guiding elements will not always impact on the same point of the guiding cam, but on different points which are statistically spread, for example, by means of a random generator. It would also be possible to change the point of impact over time, either continuously or linearly. Although this does not necessarily reduce a specific transmission of force between the guiding element and the guiding roller, it is achieved on average that the entire guiding cam or the above-mentioned area thereof is exposed to lower loads and will therefore not have to be replaced until a later time.

In some exemplary embodiments, the guiding element may be a guiding roller. The guiding roller may be disposed on the treatment unit. In some aspects, the apparatus may have a plurality of treatment units and each of these treatment units may have a corresponding guiding element or a guiding roller.

In some exemplary embodiments, the guiding elements of several treatment units are at least partially staggered relative to each other in a direction extending vertically relative to the path of travel. For example, it would be possible for the guiding elements to be staggered relative to each other along a circular guide track in a radial direction relative to the guide track. In this way, too, the force acting on a certain location of the guiding cam may be reduced on average.

In some exemplary embodiments, the apparatus may have a contact body disposed adjacent to the guiding cam, which will come into contact with the guiding element before the guiding cam. In this way, the transmission of force from the guiding element onto the guiding cam is reduced. This contact body may, for example, be an element which can readily be replaced and which is only used for reducing the force of the roller onto the guiding cam. On the one hand, this makes it possible to reduce the forces acting vertically on the guiding cam. Further, this contact body may also be used to accelerate the guiding element, so that it already has a correct speed of rotation when it impacts on the guiding cam, and in this way the forces may be reduced. In this connection it would, however, also be possible to dispose an appropriate contact body on the treatment unit and this contact body would initially come into contact with the guiding cam.

In some exemplary embodiments, the contact body may be spring-mounted. By means of this spring-mounting, the occurring forces may be absorbed or dampened. Further, in some aspects, the contact body may also have a replaceable contact surface such as, for example, one made from a rubber-like material.

In some exemplary embodiments, the guiding element has a contact surface such as, for example, one made from a rubber-like material.

In some exemplary embodiments, the guiding element and/or the contact body may have a magnetic element. The magnetic element may be used to attract the guiding element and the guiding cam toward one another at an early stage. Also, this magnetic element may be used to accelerate the guiding element, such as for example a guiding roller, in its rotational direction already before it impacts on the guiding cam. In doing so, it is possible that the magnetic element has a plurality of magnets with changing orientation, which interact with the guiding element or the respective other element in the way of a contact-free gear, in order to accelerate the same in the direction of rotation. The magnetic element may further be used to place the guiding element gently on the contact body or the guiding cam by means of a relatively weak magnetic force, before the actual force, caused for example by a pneumatic cylinder, begins to act.

According to various aspects, the apparatus is selected from a group including moulding means for plastic containers, filling means for containers, washing means for containers, closing means for containers, labelling apparatus, packaging apparatus or palletizing apparatus. In the case of a moulding unit for plastic containers, the guiding cam may for example be a stretching cam for actuating a stretching rod, a blow nozzle cam for actuating the movement of the blow nozzle, a guiding cam for an indexing star, and the like.

Further, the guiding cam may also be a transport star cam, a lifting cam for heating mandrels in an oven, a locking cam for a mould carrier, a driving cam for the opening movement of a mould carrier, a lifting cam for a blow-moulding bottom or a lifting cam for a rinser for the preforms. If the apparatus mentioned is a filling device for containers, the guiding cam may for example be a valve actuating cam or also a bell lever cam. If the apparatus is used in a washing device for containers or in rinsers, the guiding cam may be a control cam. In the case of a closing device for containers it may be a closing lift cam.

In the case of a labelling machine, the guiding cam could be a lifting cam for controlling the centring head, if present, by means of the centering bell, and if the apparatus is a packaging or palletizing machine, it may for example be a corresponding wrapping cam of a chain link guide.

One suitable application of the present disclosure, however, is for the above-described case of a blow moulding machine or moulding unit for converting plastic preforms into plastic containers.

The present disclosure is further directed to a method for treating containers and in particular liquid containers, wherein the containers are treated by means of at least one treatment unit in a predetermined manner and the treatment unit is moved along a specified path of travel, and wherein a guiding cam of the apparatus effects at least once along the path of travel a movement of the treatment unit in a direction extending vertically relative to the path of travel.

Herein, a guiding element of the treatment unit is at least at times in contact with the guiding cam, and a force acting between the guiding element and the guiding cam is varied at least at times along a specified area of the path of travel. According to the invention, the force acting on a certain point of the area between the guiding cam and the guiding element is reduced at least on average. Thus, it is proposed also in connection with the method to reduce the forces acting on the guiding cam at least on average, which in its turn is made possible by way of spreading the points of impact or by means of reducing the forces specifically acting in each case.

In an exemplary method, the guiding element is at times in contact with the guiding cam and at times it is not in contact therewith, whilst the guiding element comes into contact with the guiding cam at the point of impact which is in the specified area, and a force acting on a specified point of the area and in particular on this point of impact between the guiding cam and the guiding element is reduced at least on average.

In some aspects, as mentioned above, the point of impact is varied, and this variation may be carried out in particular in a statistic or linear manner.

In a further exemplary method, the force acting between the guiding cam and the guiding element may be reduced by means of an additional contact body.

Some further advantages and embodiments may become evident from the attached drawings.

DETAILED DESCRIPTION

Figure 1:
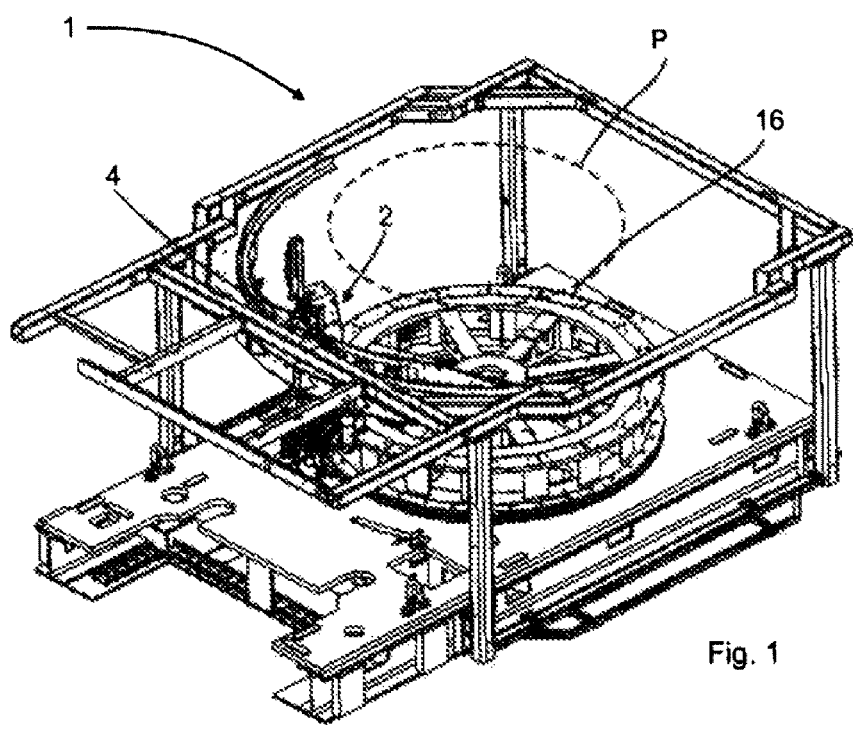
FIG. 1 shows a perspective view of an apparatus for treating containers in accordance with various aspects of the disclosure.

FIG. 1 illustrates an exemplary apparatus 1 for treating containers in accordance with the disclosure. This apparatus has here a transport wheel 16 on which a plurality of treatment units 2 (of which, however, only one treatment unit 2 is shown for purposes of clarity) are arranged. The path of travel P, along which the treatment unit 2 is moved, describes a circle. Moreover, the treatment unit 2 or an element of this treatment unit is moved by means of a guiding cam 4 also in a direction extending vertically relative to this path of travel P.

Figure 2:
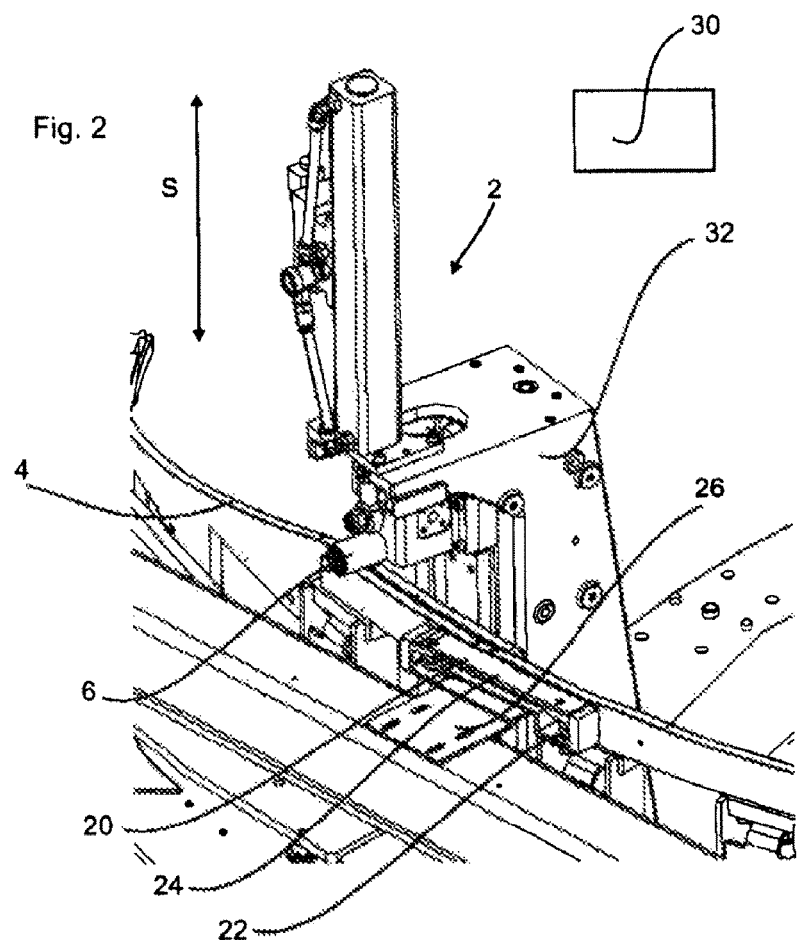
FIG. 2 shows a partial view of an apparatus according to the disclosure for treating containers.

FIG. 2 is a partial illustration of an apparatus according to the disclosure. Here, too, the treatment unit 2 is shown, which has a carrier 32 as well as a treatment element (not shown in detail), which may be moved in the direction S, i.e., vertically relative to the path of travel P shown in FIG. 1. In this connection, the treatment unit 2 has a guiding element, for example, a guiding roller 6, which is guided along a guiding cam 4. It can be seen that the guiding cam 4 may be designed in several parts, but it would also be possible to form the guiding cam in one piece. Further, the guiding curve does not necessarily have to extend along the entire path of travel, but it would be possible for it to be provided only in several areas.

In the illustration shown in FIG. 2, the guiding roller 6 is located above the guiding cam 4 and is placed on this guiding cam 4 in a certain area. In this area, the guiding cam 4 may wear as a result of the continuous operation thereof. In order to reduce the effect of the force caused by this placement, a contact body 20 is provided which is designed in such a way that the guiding roller will initially touch down onto the contact body 20 or the contact surface 24 thereof and only then on the guiding cam 4.

In this way, the forces between the guiding cam 4 and the guiding element 6 may be reduced. It can be seen that the contact body has a spring 22, by means of which the contact surface 24 is spring-mounted. The reference numeral 26 relates to a support for the contact body 20. By means of the spring 22, the forces occurring may be cushioned. In the embodiment shown in FIG. 2, two springs 22 are provided. It would, however, also be possible to provide only one spring or more than two springs and to provide an articulated shaft or a swivel base, for instance, on the opposite side of the contact surface.

In addition, however, the apparatus may also have a control device 30 arranged to adjust the exact point in time and thus also the exact location at which the guiding element 6 touches down on the guiding cam 4.

Figure 3:
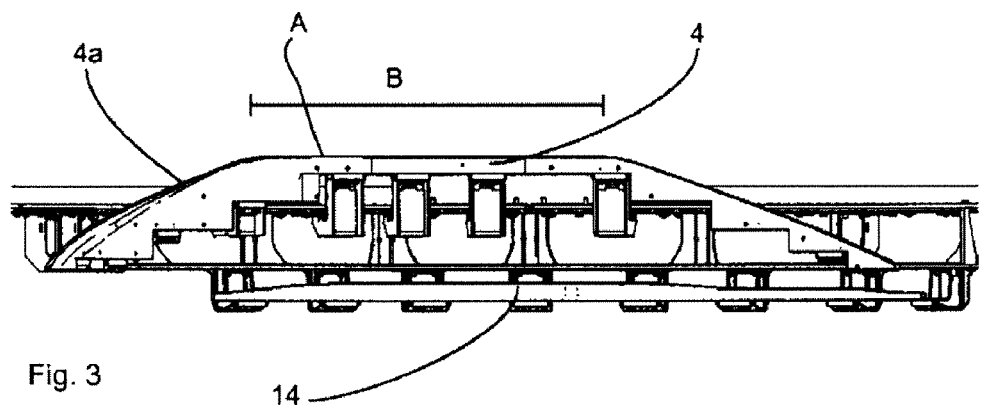
FIG. 3 shows a schematic view for illustrating the pathway of a guiding cam.

FIG. 3 shows a lateral view of an exemplary guiding cam 4 according to the disclosure. What can be seen here are a sloped area 4a and an area B immediately following this area 4a. Within this area B, the point of impact A is located, in which the guiding element (not shown) touches down onto the guiding cam 4. In the prior art, the guiding element will also always start from this point of impact A. For example, in the case of an application in connection with a stretching cylinder, this stretching cylinder may (e.g., by means of a random generator) be driven in such a way that wear is spread over the entire cam or the entire area B. In this way, the life of the cam may be extended. In this connection it would also be possible, for example, to randomly ventilate a corresponding stretching cylinder and to pull the roller onto the cam by means of an electromagnet, in order to reduce the shock of the impact.

Figure 4:
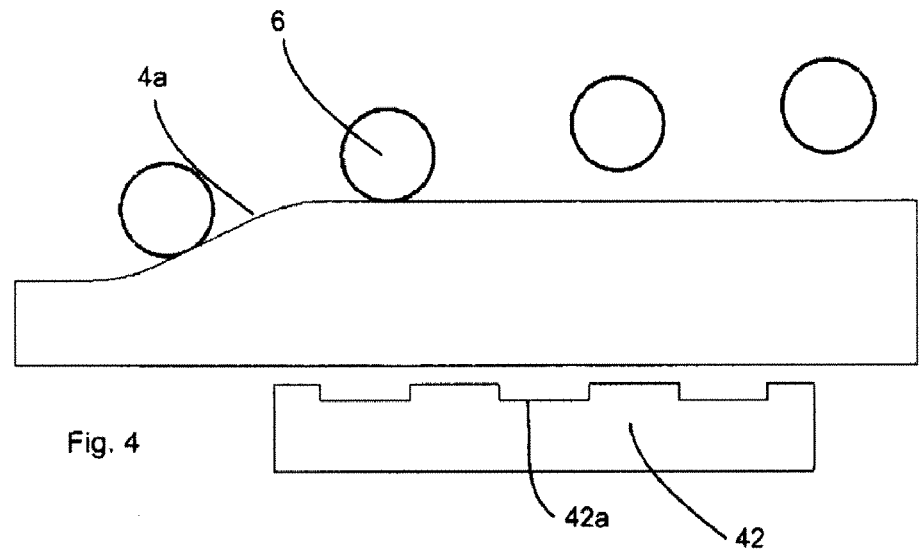
FIG. 4 shows a schematic view for illustrating a solution according to the disclosure.

FIG. 4 shows a further schematic illustration of an apparatus according to the disclosure. This also illustrates how the individual guiding rollers 6 touch down on the guiding cam 4 or the area B of this guiding cam 4. The reference numeral 42 identifies a magnetic element, wherein the individual notches 42a illustrate an alternating north/south orientation of this magnet. If the guiding rollers 6 also have alternating magnets, the guiding cams may already be accelerated in the circumferential direction thereof or the guiding rollers may already be set in rotation.

In addition, magnets may be used in this area, which for example cause a stretching carriage to touch down randomly and/or more gently onto the stretching cam.

Figure 5:
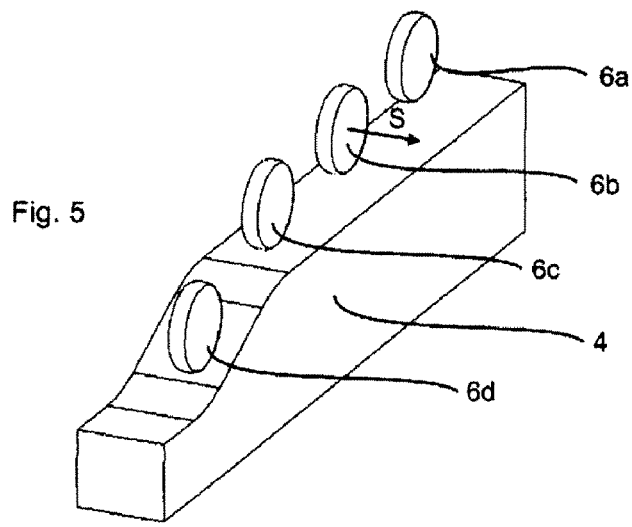
FIG. 5 shows an oblique view of a further embodiment of a solution according to the disclosure.

FIG. 5 shows a further schematic illustration for an exemplary apparatus according to the invention. In this case, a plurality of guiding rollers 6a-6d are provided, wherein these, as shown in FIG. 5, are staggered in a radial direction relative to the guiding cam 4, i.e., vertically relative to the lateral surfaces of the guiding rollers (see arrow S). In this way, too, the point loading exerted by the guiding rollers 6a-6b on the guiding cam 4, is reduced.

In addition to that, the measures mentioned may also be combined, i.e., the guiding rollers 6 may be staggered in the direction S and at the same time the measures described above and in particular a variation of the point of contact A may be carried out.

If the guiding cam 4 is a stretching cam for a blow-moulding machine, then this may for example comprise three pieces, namely, a catching segment, a landing segment, and a stretching segment. During the production using the machine, the above-mentioned guiding roller of the stretching carriage will very frequently impact on exactly the same point of the landing segment, so that this will wear and will have to be replaced. Thus, also as described above, it may be possible to vary the point of activating the stretch valve as a function of the number of operation hours, for example, to activate it at 0° in the new condition as previously, at 2° after 2000 hours, at 4° after 4000 hours, etc. In this way, the loading of the landing segment may be spread over a wider area and the lifetime may be considerably increased. An appropriate switching modulation may be established in advance. Such a variable activation device could also be retrofitted for this machine as well as for other machines.

It will be apparent to those skilled in the art that various modifications and variations can be made to the apparatuses and methods for reducing wear on control cams of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An apparatus for treating containers, the apparatus comprising:
    at least one treatment unit configured to treat containers in a predetermined manner, the treatment unit being movable along a specified path of travel;
    a guiding cam structured and arranged to effect, at least once along the path of travel, a movement of the treatment unit in a direction extending vertically relative to the path of travel, said treatment unit having a guiding element which, at least at times, is in contact with the guiding cam, a force acting between the guiding element and the guiding cam varying at least at times along a predetermined area of the path of travel; and
    a force reducing device which causes at least the force acting at a certain point of the area between the guiding cam and the guiding element to be reduced at least on average.

2. The apparatus as claimed in claim 1, wherein the guiding element is at least at times in contact with the guiding cam and at least at times out of contact with the guiding cam, the guiding element coming into contact with the guiding cam at a point of impact lying in the specified area, wherein the force reduction device causes the force acting at a certain point of the area between the guiding cam and the guiding element to be reduced at least on average.

3. The apparatus as claimed in claim 1, wherein a projection of the path of travel in the direction extending vertically relative to the path of travel is substantially a circle.

4. The apparatus as claimed in claim 1, wherein the point of impact is variable within said area.

5. The apparatus as claimed in claim 4, wherein the point of impact is statistically changed.

6. The apparatus as claimed in claim 1, wherein the guiding element is a guiding roller.

7. The apparatus as claimed in claim 1, wherein the apparatus includes a plurality of treatment units, each of said plurality of treatment units having guiding elements, said guiding elements being at least partially staggered relative to each other in a direction extending vertically relative to the path of travel.

8. The apparatus as claimed in claim 1, wherein the apparatus includes a contact body disposed adjacent to the guiding cam, the contact body being contacted by the guiding element before the guiding cam.

9. The apparatus as claimed in claim 8, wherein the contact body is spring-mounted.

10. The apparatus as claimed in claim 1, wherein at least one of the guiding element and the contact body has a magnetic element.

11. The apparatus as claimed in claim 1, wherein the apparatus is selected from a group of apparatuses including at least one of moulding means for plastic containers, filling means for containers, washing means for containers, closing means for containers, labelling means, packaging means, and palletizing means.

12. The apparatus as claimed in claim 1, wherein the apparatus comprises an apparatus for filling liquid containers.

13. A method for treating containers, wherein the containers are treated by means of at least one treatment unit in a predetermined manner, the method comprising:
    moving a treatment unit along a specified path of travel;
    moving a guiding element of the treatment unit into contact with a guiding cam at least once along the path of travel, said movement of the guiding element into contact with the guiding cam being in a direction extending vertically relative to the path of travel;
    maintaining contact between the guiding element and the guiding cam at least at times along a specified area of the path of travel, a force acting between the guiding element and the guiding cam varying at least at times along said area; and
    reducing, at least on average, the force acting at a certain point of said area between the guiding cam and the guiding element.

14. The method as claimed in claim 13, wherein the guiding element is at least at times in contact with the guiding cam and at least at times out of contact with the guiding cam, the guiding element coming into contact with the guiding cam at a point of impact lying in the specified area, the force acting at a certain point of the area between the guiding cam and the guiding element being reduced at least on average.

15. The method as claimed in claim 13, further comprising varying the point of impact between the guiding element and the guiding cam.

16. The method as claimed in claim 13, wherein said step of reducing comprises reducing the force acting between the guiding cam and the guiding element by means of a contact body.

17. An apparatus for treating containers, the apparatus comprising:
    at least one treatment unit configured to treat containers in a predetermined manner, the treatment unit being movable along a specified path of travel;
    a guiding cam structured and arranged to effect, at least once along the path of travel, a movement of the treatment unit in a direction extending vertically relative to the path of travel;
    a guiding element associated with the treatment unit, the guiding element at least at times being in contact with the guiding cam, a force acting between the guiding element and the guiding cam varying at least at times along a predetermined area of the path of travel; and
    a force reducing device associated with the guiding cam, the force reducing device causing at least the force acting between the guiding cam and the guiding element at a certain point of said area to be reduced at least on average.

18. The apparatus as claimed in claim 17, wherein the guiding element is at least at times in contact with the guiding cam and at least at times out of contact with the guiding cam, the guiding element coming into contact with the guiding cam at a point of impact lying in the specified area, wherein the force reduction device causes the force acting at a certain point of the area between the guiding cam and the guiding element to be reduced at least on average.

19. The apparatus as claimed in claim 17, wherein the point of impact is variable within said area.

20. The apparatus as claimed in claim 17, wherein the guiding element is a guiding roller, and wherein the force reducing device includes a contact body disposed adjacent to the guiding cam, the contact body being configured to be contacted by the guiding element before the guiding element contacts guiding cam.

* * * * *